March 30, 1965 G. NATTA ETAL 3,175,999
BLOCK POLYMERS OF ALPHA-OLEFINES, PROCESSES FOR PRODUCING THE
SAME, AND MIXTURES THEREOF WITH ISOTACTIC POLYOLEFINES
Filed Aug. 3, 1956 3 Sheets-Sheet 1

INVENTOR.
BY GIULIO NATTA
GIOVANNI CRESPI

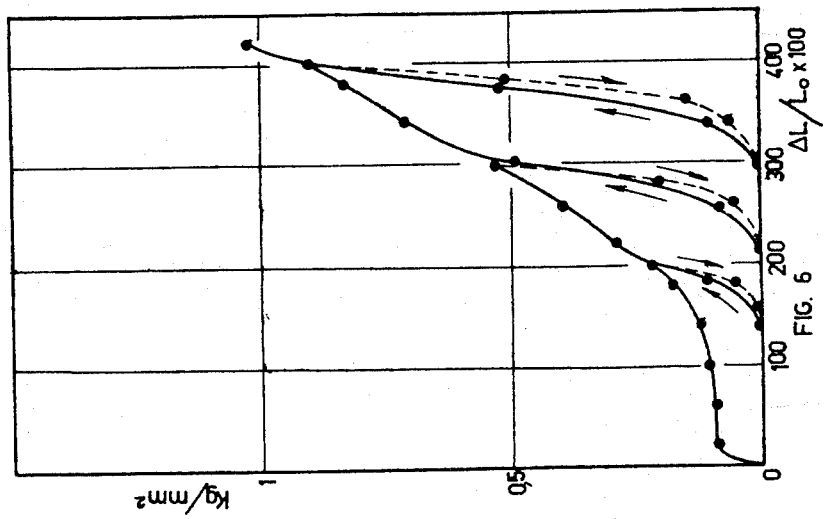
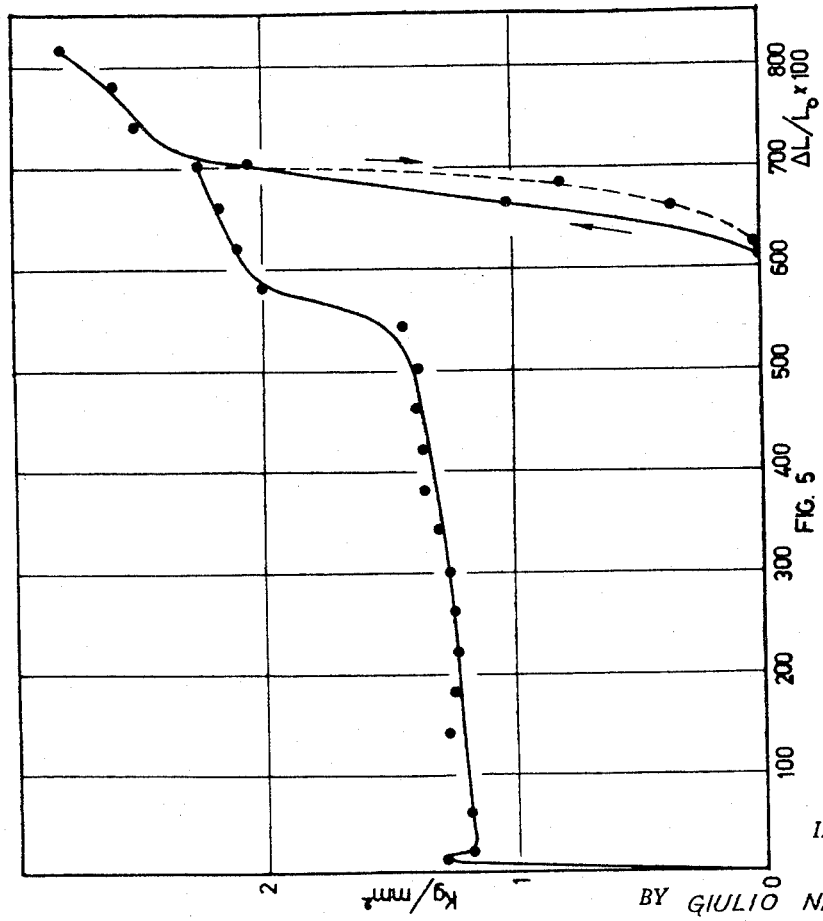

United States Patent Office 3,175,999
Patented Mar. 30, 1965

3,175,999
BLOCK POLYMERS OF ALPHA - OLEFINES, PROCESSES FOR PRODUCING THE SAME, AND MIXTURES THEREOF WITH ISOTACTIC POLYOLEFINES
Giulio Natta and Giovanni Crespi, Milan, Italy, assignors to Montecatini Societa Generale per l'Industria Mineraria e Chimica, a corporation of Italy
Filed Aug. 3, 1956, Ser. No. 602,010
Claims priority, application Italy, Aug. 6, 1955, 11,523/55
7 Claims. (Cl. 260—93.7)

This invention relates to high polymers of alpha-olefines and to processes for preparing the same. More particularly, the invention relates to amorphous-crystalline, linear, head-to-tail block polymers of the alpha-olefines having unusual properties and which cannot be separated by solvent extraction into completely amorphous or completely crystalline polymers, and to methods for obtaining the same.

The new block alpha-olefine polymers of the invention which may be called stereoisomer block polymers, consist of macromolecules formed by sections (or blocks) of different structure as follows:

(A) Macromolecules containing isotactic sections, i.e., sections composed of long sequences of monomeric units containing asymmetric carbon atoms each sequence consisting of asymmetric carbon atoms having the same steric configuration, and (B) Non-isotactic (atactic) sections in which the asymmetric carbon atoms of the two possible steric configurations are distributed in an irregular order or in an order not sufficiently regular to allow of their crystallization.

The block polymers are prepared by polymerizing a single alpha-olefine with the aid of a catalyst prepared from a compound of a transition metal of the 4th, 5th and 6th groups of the Periodic Table and a compound of a metal of the 2nd or 3rd groups of the Periodic Table, and working up the crude polymerizate to recover the block polymers therefrom.

The polymerization of the alpha-olefine with the aid of the aforesaid catalysts to obtain linear polymers with a head-to-tail enchainment is described in the pending applications of G. Natta et al., Serial Nos. 514,097, now abandoned; 514,098 and 514,009, all filed June 8, 1955, and Serial No. 550,164, filed November 30, 1955.

Certain of the linear head-to-tail polymers obtained by the method described are found to be crystalline in the solid state at an X-ray examination, or are crystallizable at temperatures lower than the melting temperature. Such polymers, which consist of molecules containing sequences of asymmetric carbon atoms having the same steric configuration have been named "isotactic polymers."

Other of the linear, head-to-tail polymers obtained are amorphous and not crystallizable. These amorphous polymers consist of linear molecules also having a head-to-tail enchainment, but containing the asymmetric carbon atoms of the two different steric configurations in an irregular order. These amorphous polymers have been named "non-isotactic polymers" or "atactic polymers" and will be so referred to herein.

The properties of the isotactic polymers in the solid state are very different from those of the atactic polymers. For example, it is possible to separate the isotactic polymers from the atactic polymers by using particular solvents.

The pending application Serial No. 550,164, supra, also discloses that, by selection of specific catalysts of the type mentioned, it is possible to obtain directly, without need for solvent fractionation of polymer mixtures, polymers which are predominantly isotactic whereas, by the use of other specific catalysts of the same general type, atactic polymers free or substantially free from isotactic polymers are obtained. Thus, it is disclosed that when the catalyst is prepared starting with a crystalline compound of the transition metal in which the metal has a valency lower than the maximum valency corresponding to its position in the Periodic Table, predominantly isotactic polymers are produced. When soluble, non crystalline compounds are employed, in which the transition metal has in general a higher valency, predominantly atactic polymers are obtainer.

Normally, when the alpha-olefine is polymerized with the aid of the catalyst prepared from the transition metal compound and metallo-organic compound, the polymerizate comprises a mixture from which there can be obtained, by extraction with appropriate solvents, readily soluble fractions consisting of atactic amorphous polymers and mixed fractions of intermediate solubility.

Intermediate fractions obtained as indicated above in the solvent extraction of the crude propylene polymer prepared with the aforesaid catalysts, and which could be considered as consisting of mixtures of lower molecular weight crystalline polymers and higher molecular weight amorphous polymers, possess poor mechanical properties. Articles obtained by molding such fractions have ultimate tensile strengths of only 1 kg./mm.$^2$ and elongations at break of 300–400%. This must be compared with an ultimate tensile strength of 4–5 kg./mm.$^2$ and elongations at break of 600–800% for articles made from the isotactic polymers (see Example 1 below).

It is apparent that those fractions do not provide articles having the most desirable mechanical properties.

Surprisingly, we find that the block polymers of the alpha-olefines, and composed of the macromolecules made up of the sections (A) and (B) inseparable by solvent fractionation as described hereinabove, which block polymers comprise atactic and isotactic portions but are different from mechanical mixtures of the two types of polymers, have superior mechanical properties, which are different from the properties of both isotactic and atactic polymers and which adapt them to be molded and extruded into useful articles of particular characteristics.

The invention will be more readily understood by reference to the accompanying drawings in which FIGURES 1 to 6 are stress-elongation graphs showing values for ultimate tensile strength and elongation, $\Delta L/L_0$ of molded articles.

FIGURE 5 is the stress-elongation graph for an article (unstretched) molded from the residue obtained by extracting the heptane extract of crude polypropylene with isopropyl ether, to remove the "block" polymers therefrom according to Example 2; and FIGURE 6 is the stress-elongation graph for articles folded from pentene-1 "block" polymers according to Example 5.

The block polymers are obtained by treating certain of the intermediate fractions with solvents which may be described as having a dissolving capacity for the polypropylene which is intermediate that of diethyl ether and n-heptane.

From an X-ray examination of the fractions comprising the block polymers, it appears that they possess a partial crystallinity. However, since they do not contain a crystalline portion which can be separated from the amorphous portion, it must be assumed that such fractions consist of the macromolecules formed of the sections (A) and (B).

If a propylene polymer prepared with the aid of a catalyst of the type mentioned, is extracted successively with ether and boiling heptane there are obtained an amorphous fraction soluble in the ether, a partially crystalline fraction extractable with boiling heptane, and a highly crystalline fraction insoluble in heptane.

The fraction extractable with heptane is not homogeneous. It can be further fractionated by extraction with solvents having a dissolving capacity for the polypropylenes between that of ether and heptane, and which have however even at high temperatures, a scarce dissolving capacity for the isotactic polymers, for example isopropyl ether. The fraction thus extracted, which is prevailingly amorphous, comprises block polymers, as defined herein. The residue of the isopropyl ether extraction consists of a crystalline block polymer of relatively low molecular weight.

The fraction extracted with isopropyl ether and comprising the block polymers has valuable mechanical properties.

Stress-elongation graphs obtained on testing molded sheets or extruded filaments of the fraction comprising the block polymers of propylene for tensile behavior are shown in FIGURES 1 to 4 of the accompanying drawing.

Figure 3:
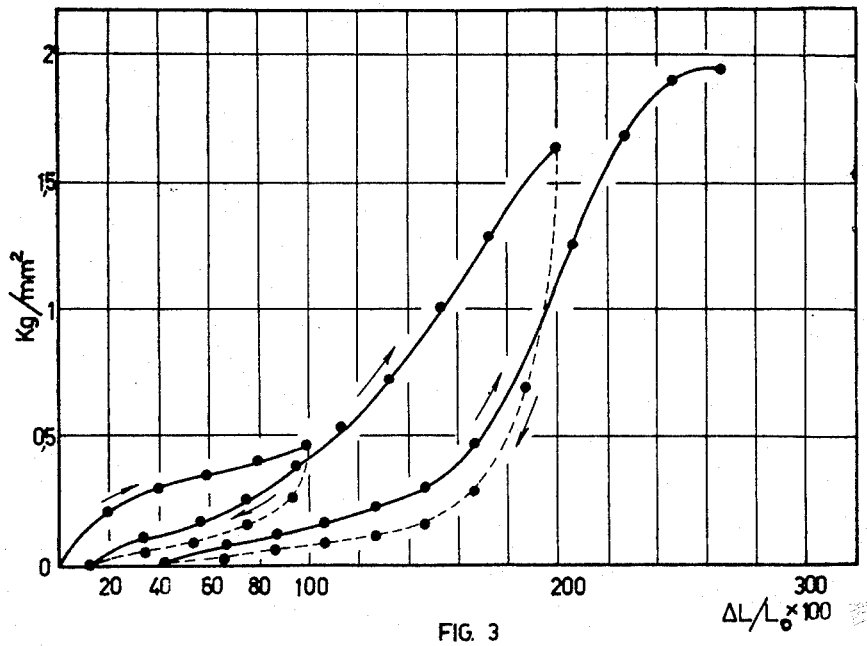
FIGURE 3 is the stress-elongation graph for the article of FIGURE 2, but after pre-stretching of the article by 700%.

As shown in FIGURE 3 of the drawing (and Example 1 below), an article formed of the propylene block polymers and pre-stretched by 700%, yields a stress-elongation graph which can be compared with that of an elastomer, even though the block polymer of propylene is non-vulcanized and has a relatively low molecular weight.

The elasticity of the fraction comprising the block polymer of propylene can be attributed to the presence of amorphous portions the chains of which retain a remarkable mobility even in the cold condition.

The fraction comprising the block polymer shows, after stretching, a high elasticity and substantially no creep. This is in contrast to the behavior of an amorphous polypropylene of low transition temperature, which has poor mechanical strength and, when submitted to mechanical stress, shows continuous plastic flow (creep).

The behavior of the fraction comprising the block propylene polymers extractable with isopropyl ether can be compared with that of a vulcanized rubber and must be attributed to the fact that, although the fraction is prevailingly amorphous, it contains a crystallizable portion, since it exhibits, when oriented by stretch, the behaviour characteristic of a vulcanized rubber yet has not been subjected to any chemical treatment corresponding to a vulcanization.

The polypropylene fraction extractable with isopropyl ether and comprising block polymers shows a certain crystallinity in the unstretched condition. In this, it differs from the common elastomers such as natural rubber which are amorphous in unstretched condition and become crystalline after stretching.

The fractions comprising the polymers containing macromolecules composed of isotactic and atactic blocks are very different from mechanical mixtures of the amorphous and crystalline polymers. This is evident from a comparison of the stress-elongation curves. While the mechanical mixtures, when subjected to stress for short times, show a certain elasticity and may seem to have properties similar to those of the block polymers, remarkable differences in creep are observed. A creep is noted in the mechanical mixtures, whereas, the block polymers exhibit practically no creep.

Also the percent crystallinity being equal, the mechanical properties, including the ultimate strength, of the artificial mixtures of atactic and isotactic polymers are in general considerably poorer than the corresponding mechanical properties of the block polymers.

In fractionating the crude polymeric alpha-olefines, it is possible to avoid the separation of fractions consisting of mixtures of polymers of different structure. This can be done by carrying out the extraction at temperatures increasingly higher, using solvents having increasing dissolving capacity for the poly-alpha-olefines, so that heterogeneity of the individual fractions is reduced to a minimum.

For example, when a prevailingly amorphous polypropylene prepared with the aid of a catalyst obtained from titanium tetrachloride and tripropyl aluminum is extracted first with acetone to dissolve the oily portion, and then with boiling heptane to dissolve completely the amorphous portion, the heptane fraction contains not only all of the amorphous polymer but also considerable amounts of crystalline polymer. In fact, the residue of the acetone extraction is largely soluble in boiling heptane. Under those conditions, block polymers are not isolated.

However, if the crude polymerizate is extracted first with acetone, then with ether and finally with heptane, the residue of the heptane extraction is made up of isotactic macromolecules as shown in U.S.P. 3,112,300.

Block polymers consisting of macromolecules containing low ratios of isotactic to non crystallizable amorphous sections can be obtained by extracting the residue of the ether extraction with hydrocarbon solvents boiling at temperatures below the boiling point of heptane and having dissolving capacity for the poly-alpha-olefines between that of diethyl ether and heptane.

In fractionating block polymers to obtain the polymers consisting of macromolecules containing different ratios of isotactic to atactic sections, it must be kept in mind that the presence of atactic sections in a molecule containing isotactic sections has the effect of lowering the temperatures at which melting or transition phenomena (disappearance of crystallinity) occur.

In order to separate, by extraction of the residue of the ether extraction, a block polymer having a predetermined melting temperature range, it is necessary to carry out the extraction at temperatures remarkably lower (e.g., from 45° C. to 75° C. lower) than the temperature at which the crystallinity of the particular block polymer disappears.

As an illustration, the results obtained when a same crude polypropylene was fractionated by extraction, carried out in a Kumagawa extraction at the boiling temperatures of the solvents indicated, are given in the following table:

| Solvents used successively | Polymer extracted | | Crystallinity, percent [1] |
|---|---|---|---|
| | Percent of the total | Ultimate melting temperature, ° C. | |
| 1. Acetone | 15.40 | | Oily products. |
| 2. Ethyl ether | 41.80 | | Amorphous. |
| 3. n-Pentane | 2.23 | 108 | 20. |
| 4. n-Hexane | 9.42 | 125 | 30. |
| 5. n-Heptane | 7.45 | 152 | 60. |
| 6. 2-Ethylhexane | 13.60 | 164 | 90. |
| 7. Residue | 10.10 | 170 | 100. |

[1] The percent of crystallinity is calculated assuming crystallinity of the residue to equal 100.

Each successive extraction separated a polymeric fraction from the crude polymer. The fractions extracted with pentane and hexane possess properties similar to those of the fraction obtained by extracting the residue of the ethyl ether extraction with isopropyl ether, as described hereinabove. Therefore, pentane and hexane are solvents having dissolving capacity for the poly-alpha-olefines intermediate that of ether and heptane, and the pentane and hexane-extracted fractions comprise block polymers.

A fraction of low crystallinity, having properties similar to the pentane and hexane-extracted fractions can be obtained from the residue of the ethyl ether extraction by directly extracting such residue with isopropyl ether.

The fractions obtained using higher boiling solvents (heptane) contain block polymers but have a higher content of isotactic sections and exhibit a higher mechanical strength and a lower elasticity.

Results similar to those obtained using the saturated hydrocarbons, can be obtained by using series of solvents of different types, such as ethers, esters, chlorinated hydrocarbons, or certain aromatic hydrocarbons as the extracting solvents. However, when those last-mentioned solvents are used, it is necessary, because of their more pronounced dissolving power for the poly-alpha-olefines to conduct the extraction at lower temperatures.

The solubility characteristics of the block polymers are influenced by the ratio of amorphous portion to crystalline portion present in the macromolecule. Substantially atactic macromolecules containing small isotactic portions have solubility characteristics which differ very little from those of atactic macromolecules. Correspondingly, the solubility characteristics of substantially isotactic macromolecules differ very little from those of isotactic macromolecules.

In some instances, when heptane is used as extracting solvent, it may be found that a fraction containing polymers having a small atactic content remains in the residue of the heptane extraction. This occurs, for instance, in the fractionation of polypropylene having a high molecular weight (e.g., intrinsic viscosity between 2 and 6, measured in tetralin at 135° C.).

To separate that portion of the fraction, it is necessary to use an aliphatic hydrocarbon solvent having a boiling point higher than that of heptane, for example 2-ethyl hexane. As can be seen in the table above, there is thus dissolved out a polymer having a percent crystallinity which, while high, is lower than that of the residue.

Crude, linear, head-to-tail polymers of alpha-olefines higher than propylene can be fractionated in the same general manner as the crude polypropylene, to obtain block polymers. Such higher poly-alpha-olefines include polybutene-1 and polypentene-1.

However in the fractionation of the polymers of the higher alpha-olefines it is necessary, in order to obtain the desired results, to conduct the extraction at lower temperatures; if the extraction is conducted at the boiling temperatures of the solvents, more volatile solvents must therefore be used, or else one should operate under reduced pressure.

The solubility of the crystallizable (isotactic) polymers differs from that of the non-crystallizable (atactic) polymers only at those temperatures at which the isotactic polymer is actually in the crystalline state. Therefore, the lower the transition temperature of the polymer, the lower should be the boiling point of the extracting solvent.

Thus, the crystalline polypropylenes have a melting point above 160° C. Crystalline polybutene-1, on the other hand, has a melting point of about 130° C. Boiling heptane is an efficient solvent for the extraction of polypropylene fractions rich in amorphous portions from the crude polypropylene. It is less efficient for the separation of such highly amorphous products from crude polybutene-1, and in some instances the crude polybutene-1 is completely extractable with heptane. To separate from the crude polybutene-1 a fraction comprising block polymers and rich in amorphous portions it is necessary to use, as fractionating solvent, a solvent having a lower boiling point than heptane.

The extraction of crude polybutene-1 with n-pentane or methylene chloride yields results similar to those obtained when polypropylene is treated with isopropyl ether (see Example 4). The same results may be obtained with polypentene, by use of ethyl ether (see Example 5).

It is possible, thus, by extracting a crude polybutene-1 or polypentene-1 of given composition with a series of solvents characterized by increasing dissolving capacity for the poly-alpha-olefines, to separate amorphous fractions consisting of viscous liquids, fractions containing partially crystalline macromolecules of high elasticity, and highly crystalline fractions of low elasticity.

Instead of using a series of purse solvents having progressively increasing dissolving capacity for the poly-alpha-olefines as the extracting solvents, mixtures of two or more solvents in suitable ratios may be used to separate the block polymers from amorphous polymers and from very crystalline polymers.

The elastic properties of the block polymers of the present invention can be utilized to improve the elastic properties of the crystalline polymers. Thus, by mixing a highly crystalline polypropylene having a low elastic elongation (for example 7%) with 20% of a propylene block polymer having a crystallinity of about 25%, and calendering the mixture at 190° C., a 40 to 50% improvement in the elastic elongation value can be obtained. Even better results can be obtained if the two types of polymers, that is the block polymer and the isotactic polymer, are homogenized by melting them together at elevated temperature. It is possible to obtain from such mixtures clear, flexible plates and sheets having considerable elasticity in addition to a high tensile strength.

The polymers extracted in accordance with the invention to produce the block polymers, are polymers of alpha-olefines of the formula

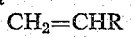

$$CH_2=CHR$$

in which R is an alkyl or aryl radical containing 1 to 16 carbon atoms and include propylene, butene-1, pentene-1, hexene-1, styrene and so on.

Polymerization of the alpha-olefine may be conducted in an inert hydrocarbon solvent. Preferred solvents are paraffinic, such as, for instance, a light gasoline substantially free of olefine bonds, n-heptane iso-octane, etc. Anhydrous benzene may also be used.

The transition metal compound used in preparing the catalyst may be a halide or oxyhalide or alkoxy halide of a metal of the 4th to 6th groups of the Mendeleeff Periodic Table, including titanium, zirconium, hafnium, thorium, vanadium, tantalum, niobium, chromium, molybdenum, tungsten and uranium.

The metallo-organic compound comprises a substance or mixture of substances selected from the group consisting of simple and complex compounds the molecules of which contain an element from the group forming the 2nd and 3rd columns of the Periodic Table, i.e., beryllium, magnesium, zinc and other elements of the 2nd column, as well as aluminium, gallium and other elements of the 3rd column.

The valencies of the aforesaid elements of the 2nd and 3rd columns are linked to the same or different alkyl radicals containing 2 to 16 carbon atoms. One of the valencies of said element may be satisfied by halogen, or by alkoxy radicals containing, e.g., 2 to 4 carbon atoms, such as ethoxy, butoxy, etc. Typical metallo-organic compounds include aluminium trialkyls, monochlorodialkyl aluminium and zinc dialkyls.

The molar ratio of the transition metal compound to the metallo-organic compound used in preparing the catalyst may be from 1:1 to 1:10, usually preferably from 1:2 to 1:5.

Also, as disclosed in the pending applications, the catalyst may be prepared by dissolving or suspending the transition metal compound in the hydrocarbon solvent to be used as the polymerization medium, dissolving or suspending the metallo-organic compound in the same hydrocarbon, and then bringing the solutions or suspensions together.

The composition thus obtained may be further diluted with the hydrocarbon solvent and introduced into a reactor.

Alternatively, the catalyst can be prepared in the presence of the alpha-olefine to be polymerized.

The polymerization can be carried out at a temperature of 50° C. to 120° C., or at lower or higher temperatures.

Other conditions being equal, an increase in the polymerization temperature leads to the formation of polymers with a higher ratio of block to crystalline fractions comprising essentially, or formed exclusively by isotatic polymers. In order to produce block polymers it may therefore prove convenient to operate at temperatures higher than the temperatures normally used for the production of crystalline polymers. When using catalysts prepared from titanium trichloride and triethyl aluminium, it is convenient to operate at temperatures higher than 100° C.

The following table shows the ratios of block to isotactic polymer fractions in propylene polymers obtained at various temperatures with catalysts prepared from titanium trichloride and triethyl aluminium.

| Polymerization Temperature ° C. | Block Polymer Ratio Substantially Isotactic Polymer |
|---|---|
| 145 [1] | 1 |
| 120 | 0.3 |
| 95 | 0.18 |
| 80 | 0.11 |

[1] When operating at 145° C. also the fraction soluble in ether contains block polymers.

The following examples are given to illustrate the invention, it being understood that these examples are not intended as limiting. In the tensile strength test referred to in the examples, the rate of separation of the grips was 50 mm./min.

Example 1

Propylene is polymerized with the aid of a catalyst prepared from titanium tetrachloride and triethyl aluminum.

The polypropylene obtained is extracted successively, in a Kumagawa extractor, with acetone, ethyl ether and heptane at boiling temperature.

After evaporation of the heptane, the fraction (A) extracted thereby appears partially crystalline (50–70%).

Fraction (A) is then extracted with isopropyl ether. After evaporation of the isopropyl ether the fraction extracted thereby (B) and comprising a "block" polymer, exhibits low (20%) crystallinity and has an average molecular weight of 21,000 (intrinsic viscosity 0.765).

Figure 2:
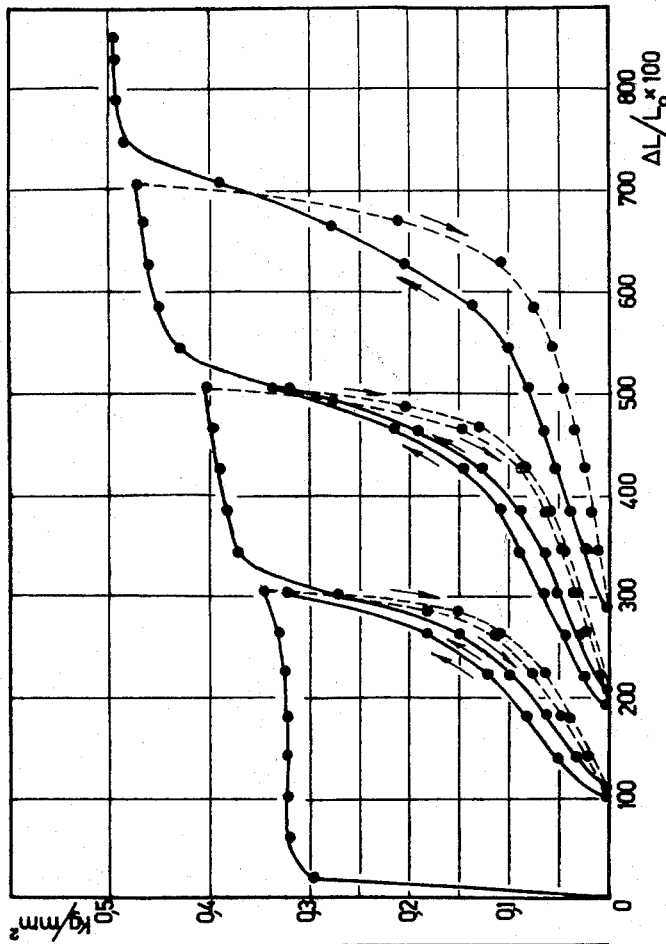
FIGURE 2 is the stress-elongation graph for an article molded of propylene "block" polymers according to Example 1, which article had not been subjected to pre-stretching.

Portions of fractions (B) are die-molded according to ASTM Test D412/51T. The mechanical properties of the unstertched molded articles are shown in FIGURE 2 of the drawing, from which it can be seen that the stress-elongation curve does not show any yield point. The elongation $\Delta L/L_0$ is 850%, and the ultimate strength is 0.5 kg./mm.$^2$, corresponding to 4.7 kg./mm.$^2$ on the calculated breaking cross-sectional area. The reversible elastic elongation is 100%, independently of the stretching conditions, and the modulus at an elongation of 200% is 32 kg./cm.$^2$.

The characteristics of the product after pre-stretching by 700% are shown in FIGURE 3 of the drawing, from which it can be observed that this product presents a reversible elastic elongation of about 100%, independently of additional stretching. The ultimate tensile strength is about 2 kg./mm.$^2$, corresponding to 7 kg./mm.$^2$ on the calculated breaking cross sectional area, and the elongation at break is 270%.

Figure 1:
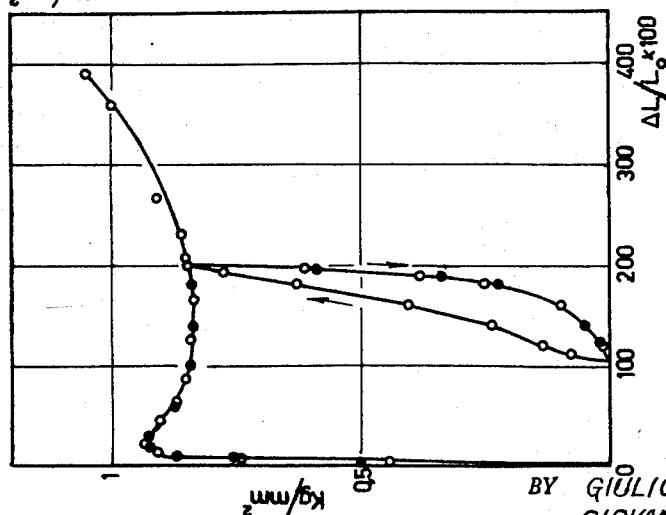
FIGURE 1 is the stress-elongation graph for a polypropylene comprising a mixture of "block" polymers which were used to obtain the specimens type (C) [fraction A] referred to in Example 1.

In contrast, when fraction (A) is molded at 140–150° C. and specimens, type (C) according to ASTM test D412/51T are prepared, the specimens give, in the tensile strength test, a stress-elongation diagram as shown in FIGURE 1 of the drawing. A yield point with an ultimate tensile strength of 1 kg./mm.$^2$ and an elongation at break of 380% are observed.

The residue of the isopropyl ether extraction of the heptane extract (A) is highly crystalline.

Example 2

Propylene is polymerized with the aid of a catalyst prepared from vanadium oxychloride and aluminum triethyl.

The polypropylene obtained is extracted successively with acetone, ethyl ether, and heptane as in Example 1.

Figure 4:
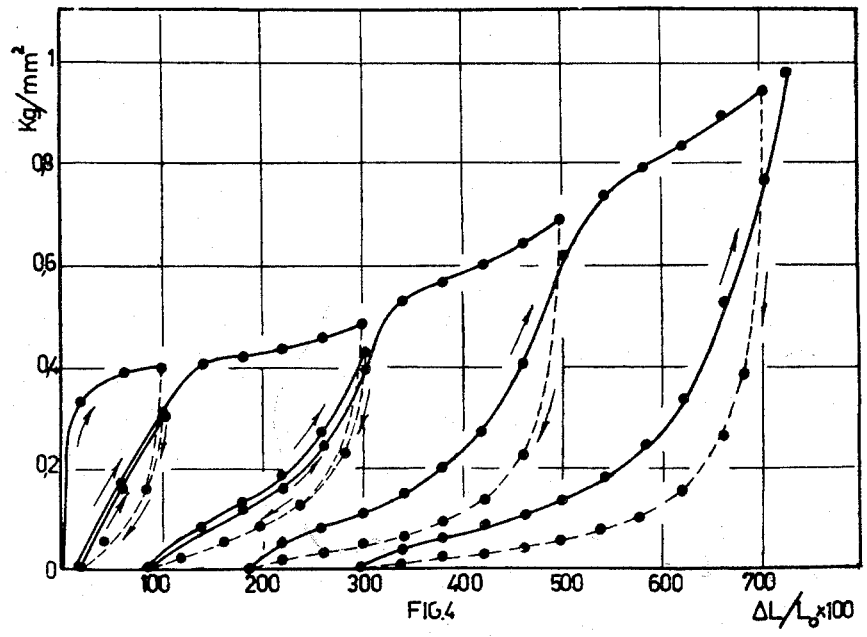
FIGURE 4 is the stress-elongation graph for molded articles of propylene "block" polymers according to Example 2.

The heptane extract (A) after removal of the solvent, is then extracted with isopropyl ether. The isopropyl ether extract (B), after evaporation of the solvent, contains, as shown by X-ray examination about 20% of a crystalline portion, and has a molecular weight of about 33,000. The mechanical properties of fraction (B) show that it contains block polymers. Test pieces molded on a hot-plate press according to the ASTM test exhibit behavior as shown in FIGURE 4 of the drawing. The stress-elongation curve does not show any yield point. The ultimate tesnsile strength is about 1 kg./mm.$^2$. The elongation $\Delta L/L_0$ is 730%.

The stress elongation curve shows a sharper slope than the articles molded from fraction (B) of Example 1, and the viscous flow of the pre-stretched molded specimens is even lower.

The reversible elastic elongation is about 100%, independently of the stretching conditions. The modulus at an elongation of 200% is 40 kg./mm.$^2$.

The residue (C) of the isopropyl ether extraction of the heptane extract has a molecular weight of about 40,000 and a percent crystallinity remarkably higher than that of fraction (B). The mechanical properties of test pieces molded from residue (C) are shown in FIGURE 5 of the drawing. The ultimate tensile strength of an unstretched specimen is 2.8 kg./mm.$^2$ and the elongation at break $\Delta L/L_0$ is 820%. The ultimate strength on the actual cross sectional area is 26 kg./mm.$^2$. The reversible elastic elongation is 12%.

Example 3

The mechanical properties of the block polymers of Examples 1 and 2 were compared with the mechanical properties of artifically prepared mixtures of crystalline and amorphous polymers of propylene. The mixtures were made from the crystalline polymer as in Examples 1 and 2 (heptane extract) and amorphous polypropylene having a molecular weight of approximately 20,000. The mixtures were homogenized by co-precipitation and evaporation of the solvent in the presence of antioxidants.

The following mixtures were prepared artificially:

(1) 80% amorphous polymer; 20% crystalline polymer. Specimens molded from mixture (1) have very high viscous flow at stresses higher than 0.2 kg./mm.$^2$. When the specimen is submitted to elongation at a rate of 50 mm./minute, a $\Delta L/L_0$ of 650% is observed. The reversible elastic elongation is about 50%.

(2) 60% amorphous polymer; 40% crystalline polymer. Specimens molded from mixture (2) also show very high viscous flow, and show, when subjected to stress:
Ultimate tensile strength=0.345 kg./mm.$^2$; $\Delta L/L$=580%.
Reversible elastic elongation=about 50%.

(3) "Block" polymer of Example 1:
Ultimate tensile strength=0.5 kg./mm.$^2$; $\Delta L/L_0$=850%.
Reversible elastic elongation=100%.

(4) "Block" polymer of Example 2:
Ultimate tensile strength=1 kg./mm.$^2$; $\Delta L/L_0$=730%.
Reversible elastic elongation=about 100%.

As can be seen from the foregoing comparison, the properties of the specimens of the mechanical mixtures (1, 2) are very different from those of the block polymers of the present invention.

Example 4

Butene-1 is polymerized with the aid of a catalyst prepared from vanadium tetrachloride and triethyl aluminum. The crude polymer is extracted with hot ether in a Kumagawa extractor. The residue (A) of such ether extraction has an intrinsic viscosity of 2.32 corresponding to a molecular weight of about 115,000.

Residue (A) is then extracted with methylene chloride to obtain an extract (B) corresponding to 6% of the residue and having a crystallinity about 20% lower than that of residue (A).

The residue (C) of the methylene chloride extraction appears, on the contrary, on X-ray examination, more crystalline than the extracted product.

The methylene chloride extract (B) has a high reversible elasticity which indicates that it comprises block polymers.

From this fraction specimens according to A.S.T.M. Test D412/51T were prepared by die molding. The mechanical properties of the unstretched product are as follows:

Elongation at break ($\Delta L/L_0 \times 100$), percent _____ 670
Ultimate tensile strength, kg./mm.$^2$ _____ 0.32
Ultimate tensile strength, kg./mm.$^2$ (on the calculated breaking cross sectional area) _____ 2.5
Modulus at 200%, kg./mm.$^2$ _____ 10

The reversible elastic elongation is 100%, independent of the stretching conditions.

Example 5

Pentene-1 is polymerized with the aid of a catalyst prepared from titanium trichloride and triethyl aluminum.

The crude polymer is extracted with hot acetone and then with ethyl acetate. The extracted portions are amorphous.

The residue (A) of the extractions is then extracted with ethyl ether. The ether extract (B), (corresponding to about 70% of the crude polymer) has an intrinsic viscosity of 1.2 which corresponds to a molecular weight of about 45,000, and appears partially crystalline on X-ray examination.

The mechanical properties of specimens molded from extract (B) are shown in FIGURE 6 of the drawing and are those of a block polymer containing a crystalline polymer. The reversible elastic elongation is 25%, independently of the stretching conditions. The modulus at an elongation of 200% is 23 kg./cm.$^2$.

Example 6

Tests were made to determine the influence of the addition of a block polymer on the mechanical properties of a highly crystalline propylene polymer.

The residue (A) obtained by extracting a highly crystalline polypropylene with n-heptane and having an intrinsic viscosity of 4.2 was calendered at 190° C. in the presence of 1% of phenyl-β-naphthylamine as anti-oxidant. Molded specimens of residue (A) were prepared by die-molding according to the ASTM test. In the tensile strength test, the following results were obtained:

Ultimate tensile strength=3.7 kg./mm.$^2$
Elongation at break $\Delta L/L_0$=650%
Reversible elastic elongation=7% (stretched state)

The elongation value given corresponds to a load at break of 27.7 kg./mm.$^2$ on the calculated breaking cross-sectional area.

80% of the same crystalline polypropylene was mixed mechanically with 20% of a polypropylene fraction (B) obtained by first extracting crude polypropylene obtained with the aid of a catalyst as described herein and having an intrinsic viscosity of 0.8 with ethyl ether and then extracting the residue of the ether extraction with iso-propyl ether. The mixture was calendered at 190° C. in the presence of 1% of phenyl-β-naphthylamine as antioxidant.

Specimens molded from the mixture had the following tensile properties:

Ultimate [1] tensile strength=3.3 kg./mm.$^2$
Elongation at break, $\Delta L/L_0$=730%
Reversible elastic elongation in stretched state=10–11% with an increase of 40–55% in comparison with the reversible elastic elongation of the highly crystalline polypropylene

[1] 27.5 kg./mm.$^2$ on the calculated actual breaking cross sectional area.

Since various changes and modifications may be made in details in practicing the invention without departing from the spirit and scope thereof, it is to be understood that it is not intended to limit the invention except as defined in the appended claims.

What is claimed is:

1. Substantially linear, substantially homogeneous head-to-tail stereoisomer block polymers of a single alpha-olefine of the general formula $$CH_2=CHR$$

in which R is selected from the group consisting of alkyl radicals containing from 1 to 6 carbon atoms, and aryl radicals, said stereoisomer block polymers being characterized in consisting of macromolecules containing (A) crystallizable isotactic sections and (B) non-crystallizable, atactic sections, said sections (A) and (B) being inseparable by solvent fractionation.

2. Substantially linear, substantially homogeneous head-to-tail stereoisomer block polymers of polypropylene, said block polymers being characterized in consisting of macromolecules containing (A) crystallizable isotactic sections and (B) non-crystallizable atactic sections, said sections (A) and (B) being inseparable by solvent fractionation.

3. Substantially linear, substantially homogeneous head-to-tail stereoisomer block polymers of butene-1, said block polymers being characterized in consisting of macromolecules containing (A) crystallizable isotactic sections and (B) non-crystallizable atactic sections, said sections (A) and (B) being inseparable by solvent fractionation.

4. Mixture of isotactic polymers of an alpha-olefine with substantially homogeneous stereoisomer block polymers of alpha-olefine having the formula $CH_2=CHR$ where R is selected from the group consisting of alkyl radicals containing from 1 to 6 carbon atoms and aryl radicals, which block polymers are composed of macromolecules containing (A) crystallizable isotactic sections and (B) non-crystallizable, atactic sections, which sections (A) and (B) are inseparable by solvent fractionation, said mixtures being characterized by high tensile strength and, when oriented by stretching, a high reversible elastic elongation.

5. Mixtures of isotactic propylene polymers with propylene stereoisomer block polymers composed of macromolecules containing (A) crystallizable isotactic sections and (B) non-crystallizable, atactic sections, said mixtures being characterized in having a tensile strength of about 3 to 4 kg./mm.$^2$, an elongation at break of 600 to 800% and, after orienting by stretching, a reversible elastic elongation above 10%.

6. In a process in which propylene is polymerized to a crude, solid polypropylene which is normally separable by treatment with selective solvents into a non-isotactic, amorphous polymer fraction, a non-homogeneous partially isotactic, partially crystalline polymer fraction, and a highly isotactic, highly crystalline polymer fraction, the improvement which comprises extracting the polypropylene with ethyl ether to dissolve substantially the atactic polymers, removing the solution of said polymers from the undissolved residue, and then extracting the undissolved residue, at a temperature appreciably below the melting point of the crystalline polymer, with isopropyl ether to thereby selectively dissolve substantially homogeneous stereoisomer block polymers contained in said residue and consisting of macromolecules containing (A) crystallizable isotactic sections and (B) non-crystallizable, atactic sections, which sections (A) and (B) are inseparable by solvent fractionation, and separating the solution of the substantially homogeneous stereoblock polypropylene from the undissolved residue comprising solid, highly isotactic highly crystalline polypropylene.

7. In a process in which butene-1 is polymerized to a crude, solid polybutene-1 which is normally separable by treatment with selective solvents into an atactic, amorphous polymer fraction, a non-homogeneous partially isotactic partially crystalline polymer fraction, and a highly isotactic, highly crystalline polymer fraction, the improvement which comprises extracting the polybutene-1 with ethyl ether to dissolve substantially the atactic polymers, removing the solution of said polymers from the undissolved residue, and then extracting the undissolved residue at a temperature appreciably below the melting point of the crystalline polymer, with methylene chloride to thereby dissolve substantially homogeneous stereoisomer block polymers contained in said residue and consisting of macromolecules containing (A) crystallizable isotactic sections and (B) non-crystallizable, atactic sections, which sections (A) and (B) are inseparable by solvent fractionation, and separating the solution of the substantially homogeneous stereoblock polybutene-1 from the undissolved residue comprising solid, highly isotactic, highly crystalline polybutene-1.

References Cited in the file of this patent

UNITED STATES PATENTS

| | | |
|---|---|---|
| 2,721,189 | Anderson et al. | Oct. 18, 1955 |
| 2,845,410 | De Vault et al. | July 29, 1958 |

FOREIGN PATENTS

| | | |
|---|---|---|
| 538,782 | Belgium | Dec. 6, 1955 |
| 526,101 | Italy | May 14, 1955 |

OTHER REFERENCES

Natta: J. Polymer Sci., vol. 16, pages 143–154 (April 1955).

Billmeyer: Textbook of Polymer Chemistry (1957), Interscience Publishers, New York, N.Y., page 94.